Nov. 10, 1970

R. ERNST ET AL

3,539,780

DATA PROCESSING AND PRINTING ACCOUNTING MACHINE

Filed Feb. 27, 1967

Nov. 10, 1970 R. ERNST ET AL 3,539,780

DATA PROCESSING AND PRINTING ACCOUNTING MACHINE

Filed Feb. 27, 1967 7 Sheets-Sheet 2

FIG. 1b

INVENTOR

INVENTOR

INVENTOR

United States Patent Office 3,539,780
Patented Nov. 10, 1970

3,539,780
DATA PROCESSING AND PRINTING ACCOUNTING MACHINE
Richard Ernst, Werner Magde, Joachim Hilgendorf, and Arnd Reuter, Villingen, Germany, assignors to Kienzle Apparate G.m.b.H., Villingen, Black Forest, Germany
Filed Feb. 27, 1967, Ser. No. 619,530
Claims priority, application Germany, Feb. 25, 1966, K 58,559
Int. Cl. G06r 17/00
U.S. Cl. 235—61.9   15 Claims

ABSTRACT OF THE DISCLOSURE

An electronic computer is combined with an accounting machine having a high speed printer cooperating with a platen on a carriage which can be tabulated between different positions. Key switches of the accounting machine introduce values and desired functions into the computer which has program means, and controls the carriage and the printer so that the carriage places selected columns of a form opposite the printer in accordance with the program whereby numbers calculated by the computer are printed in program-determined columns.

BACKGROUND OF THE INVENTION

The present invention relates to printing accounting machines used in conection with data processing operations.

Modern electronic computers are capable of carrying out calculations at very high computing speeds, so that the problem arises how data computed at such a high speed can be used with business machines of the type used in commerce. At first, electronic computers were of extremely large size and served for carrying out a great number of computing operations so that the high computing speed was utilized. Data are introduced into computers of this type either by means of punched cards, perforated tape, or magnetic tape, while the printing was accomplished by high-speed printers. Computers of this type are very expensive, and cannot be economically used for commercial accounting or for inventory accounting.

During further development of the art, auxiliary units capable of multiplications and divisions were added to mechanical accounting machines, and the data were introduced by a keyboard from which the data were transferred to a pin carriage, or directly to the ordinal set of differential setting means of the accounting machine which controls a contact field constituting the juncture between the mechanical accounting machine, and the electronic multiplication unit. The printing of date, or the retransfer into the mechanical calculator of the accounting machine, was accomplished in different ways.

In some constructions, the data are retransferred into the mechanism of the accounting machine by means of a pin carriage controlled by electromagnetic means. In another construction, the setting means are arrested during movement by electromagnetically controlled arresting means. The control of the machine is substantially effected by the conventional program control means of the accounting machine which generally are mounted on the carriage of the accounting machine and represent the program.

It has been found that machines of this type cannot fully utilize the high computing speed of the auxiliary electronic calculating unit. Furthermore, the programming of machines of this type requires a great number of additional parts which on the one hand places a considerable load on the carriage, and on the other hand does not permit a further adaptation of the machine to other problems, so that a great number of control problems cannot be satisfactorily solved at a reasonable cost. Accounting machines of this type use mechanical storage devices of limited storage capacity, whose capacity can only be increased at great expenditure.

Billing machines are known which consist of an electronic calculating and control unit coupled with a typewriter and having an input keyboard for data. The data introduced by the keyboard are computed in the electronic computer and then automatically typed on forms, for example on invoices. The typewriter mechanism is used for typing the text and numerical data of the invoice. Accounting operations cannot be carried out with billing machines of this type, because a typewriter is a serial printer printing successively in consecutive orders in an operation which is too slow to permit the full use of the high electronic computing speed.

Electronic four species calculators having a keyboard for operating switches are also known. Machines of this type have either a visual indicator for the computed result, or a conventional printer which prints multiorder numbers in a single column on a narrow paper strip.

The disadvantage of all constructions according to the prior art is that they do not permit high speed printing under the control of an electronic computer or calculator in different columns of a form as required for accounting operations.

SUMMARY OF THE INVENTION

It is one object of the invention to overcome this disadvantage of the prior art, and to effect accounting operations involving the printing in different columns of a form by a high-speed printer under the control of an electronic computer.

Another object of the invention is to tabulate an accounting carriage with a platen and a form so that a printer which prints simultaneously in several orders prints data in selected columns of the form.

Another object of the invention is to provide an accounting machine using the high-speed and great storage capacity of electronic devices, but being capable of performing accounting operations in the usual manner.

Another object of the invention is to relieve the paper carriage of the accounting machine of the weight of program carriers, and to effect program control by an electronic computer.

With these objects in view, a data processing and printing accounting machine according to the invention comprises an electronic computer, including program means, a key switch circuit connected with the computer, a printer for printing in a column data calculated by the computer, carriage means movable relative to the printer in forward and rearward directions and having a platen cooperating with the printer and tubulating means for tubulating the carriage means so that the printer prints in selected columns.

One embodiment of the invention comprises a keyboard with input data keys and function keys operating switches of a circuit connected with a program controlled electronic computer; a multiorder printer having an ordinal series of printing means for printing in a column; an ordinal series of driven setting means cooperating with the printing means to move the same between printing positions associated with different digital values; electrically operating arresting means controlled by control means of the computer to arrest the printing means when placed by the setting means in printing positions for printing a desired value; a carriage having a platen and being movable transversely to the column of the printer; and first and second tabulating means for tabulating the carriage in forward and rearward directions so that the ordinal series of printing means of the printer prints in selected columns of a form supported on the platen.

In the preferred embodiment of the invention, the computer is adapted to add, subtract, multiply and divide, and operates under the control of exchangeable program carriers. The arresting means include electromagnetic means energized under the control of control means of the computer in timed relation to the movement of the setting means. The carriage may be moved stepwise or between columns in forward direction by a spring, and in rearward direction by a motor. The apparatus of the invention utilizes in a particularly favorable manner the high computing speed of an electronic computer, and satisfies all programming requirements since the programming is carried out within the electronic computer, and is not directly controlled by the movements of the carriage with a program control panel. Due to the use of an electric keyboard, it is possible to use function keys for different functions after changing of electric connections in a very easy manner. The use of a multi-order printer which prints simultaneously in several orders in combination with a paper carriage which can be tabulated between different column positions, permits a very fast printing of each multiorder number in a selected column. Due to the fact that the carriage can be stepwise or columnwise tabulated relative to the stationary multiorder printer, the imprinted forms can be designed as required for the particular task without any difficulties, with columns used for text or numbers arranged and spaced from each other as desired.

The novel features which are considered as characteristic for the invention are set forth in particular in the appended claims. The invention itself, however, both as to its construction and its method of operation, together wtih additional objects and advantages thereof, will be best understood from the following description of specific embodiments when read in connection with the accompanying drawings.

DESCRIPTION OF THE PREFERRED EMBODIMENTS

Figure 1A:
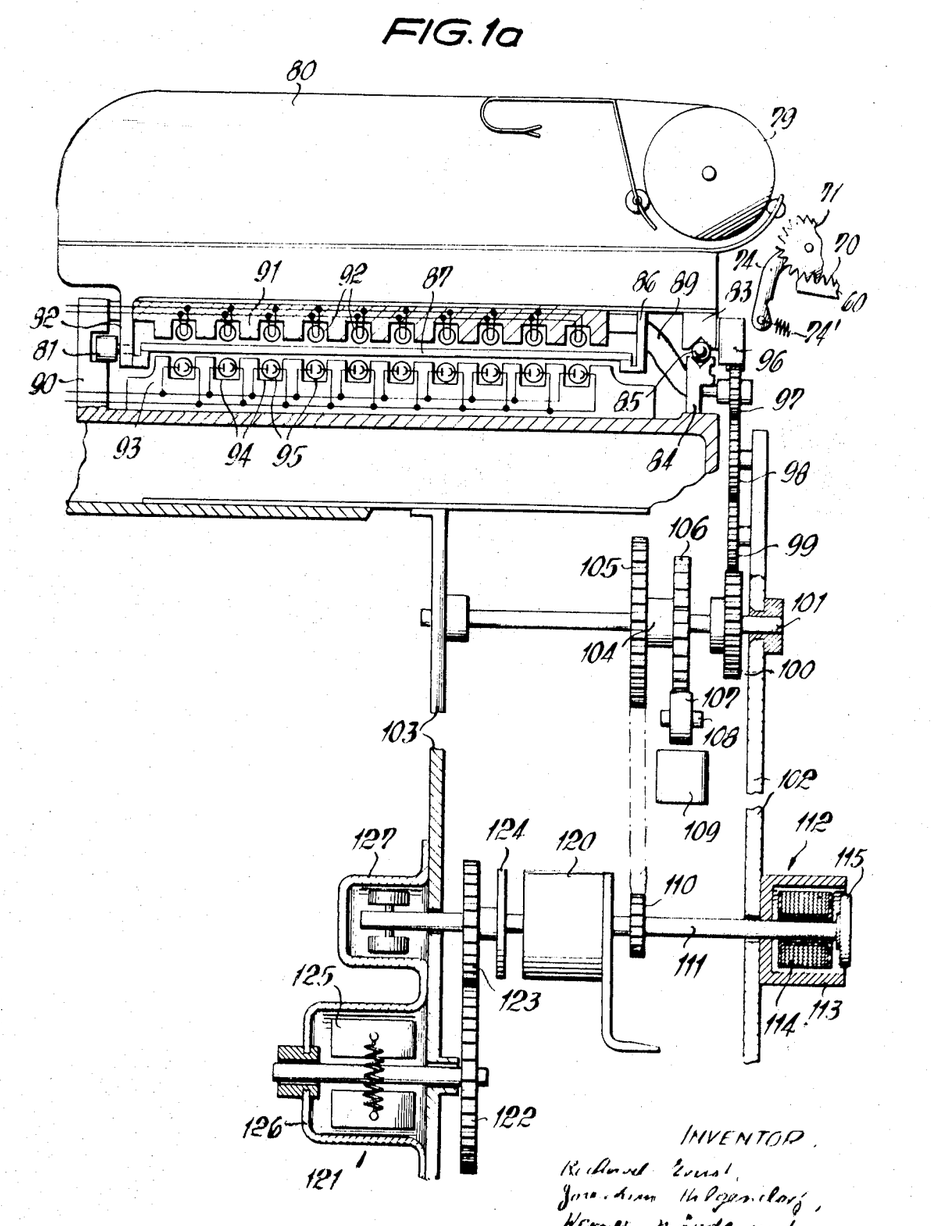
FIGS. 1a and 1b are portions of a schematic, partly exploded elevation, partially in vertical section, illustrating the mechanical parts of one embodiment of the invention.
Figure 1B:
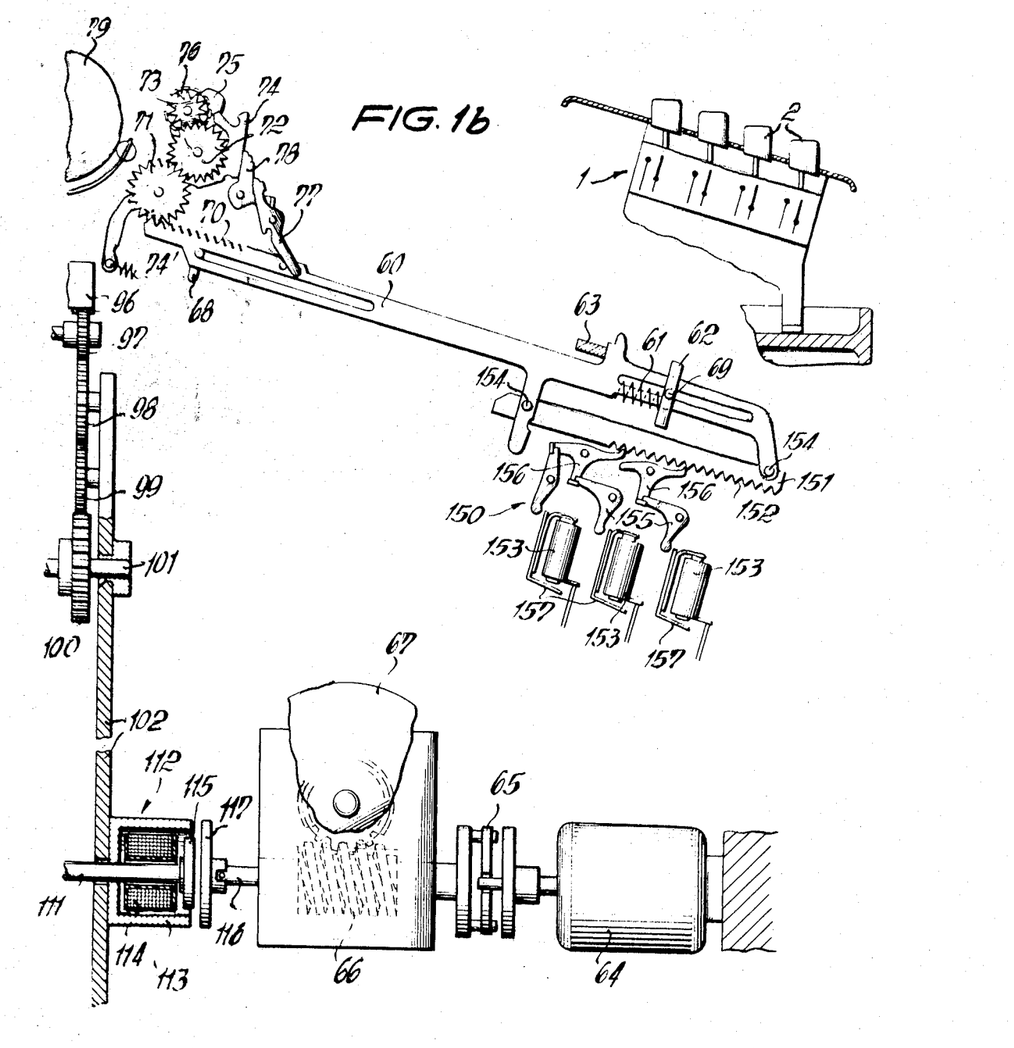
Figures 2, 3, 4, 5:
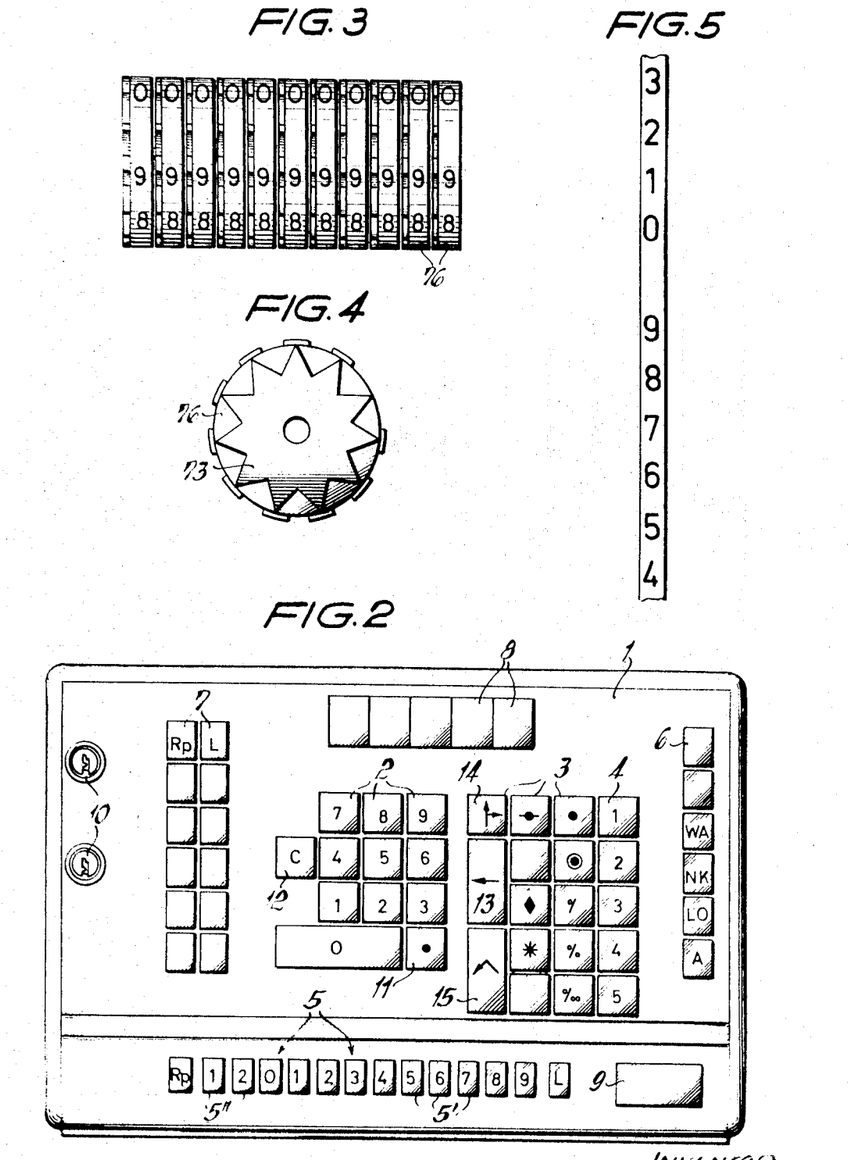
FIG. 2 is a schematic view illustrating a keyboard used in a preferred embodiment of the invention.
FIG. 3 is a schematic elevation illustrating the printing means of a multiorder printer used in the embodiment of FIG. 1.
FIG. 4 is a side view of a printing wheel.
FIG. 5 is a developed view of the periphery of a printing wheel with the printing types thereon.

Referring now to FIG. 2, a keyboard 1, which is also shown in FIG. 1b, comprises keys 2 for introducing digits, function keys 3, program selector keys 4, storage selector keys 5, control keys 6 for selectively actuating auxiliary units, and selector keys 7 controlling a printing device for printing symbols. The keyboard also has signal lamps 8, locks 10 for locking the apparatus, and a key 9 by which the apparatus is switched on. The value data input keys include nine digit keys 2, a zero key, and a "no value" key 11. A clearing key 12 for correcting an erroneous key actuation is also provided.

Function keys 3 are arranged in three rows, two of which have five keys, while the third row has three keys, for example a key 13 for tabulating in forward direction of the paper carriage, a key 14 for tabulating in rearward direction of the paper carriage, and a skip key 15 which permits the skipping of a column to which the carriage would be normally tabulated. The rearward tabulating key 14 may also be used for vertical line shifting since in one end position of the carriage, no rearward tabulating is possible.

The other ten function keys 3 have indicia representing total, subtotal, percent, per mille and and so forth. Due to the fact that each key operates a switch which is electrically connected to a controlled part, any key switch may be disconnected from the respective part, and electrically connected to another part for controlling the same, in which event the indicia on the key will have to be changed. If the inner wiring of the circuit is exchangeable due to so called macroprogramming, the functions of the keys can be varied or exchanged in any desired manner.

The five program selector keys 4 carry the numbers from 1 to 5 and effect selection of different programs according to which the computer carries out computing operations.

Keys 6 actuate auxiliary units, for example a perforator, or a sensing device for sensing punched cards, or the like, while keys 5 are used for manually selecting different storage devices for storing values. The group of keys 5' having indicia from 0 to 9 represent the values of the units of the two order number by which the storage devices are identified, while the two keys 5" represent two digits of the second decimal order. For example, for selecting storage device 12, key 1 of the key group 5", and key 2 of the key group 5' are depressed. The number of keys 5" depends on the desired number of storage devices of the electronic computer.

Signal lamps 8 may be used for various indicating purposes, and may indicate the normal performance of the machine functions, but may also indicate the actuated condition of the auxiliary units after actuation of the respective keys 6.

Value data keys 2 operate microswitches whose position is sensed during each operating cycle of the computer. The value data input keys 2 may also be used for producing input impulses by electric induction, or by photoelectric means. Manual depression of a key closes the respective key switch only for a short time, whereupon the keys return to the normal positions. However, means are provided for normally locking the keyboard so that the keys can be operated only for the introduction of values. The release of the keys takes place during the cyclical operation of the computer in accordance with the program at a time when the computer is ready to receive new input data.

Figures 10, 11:
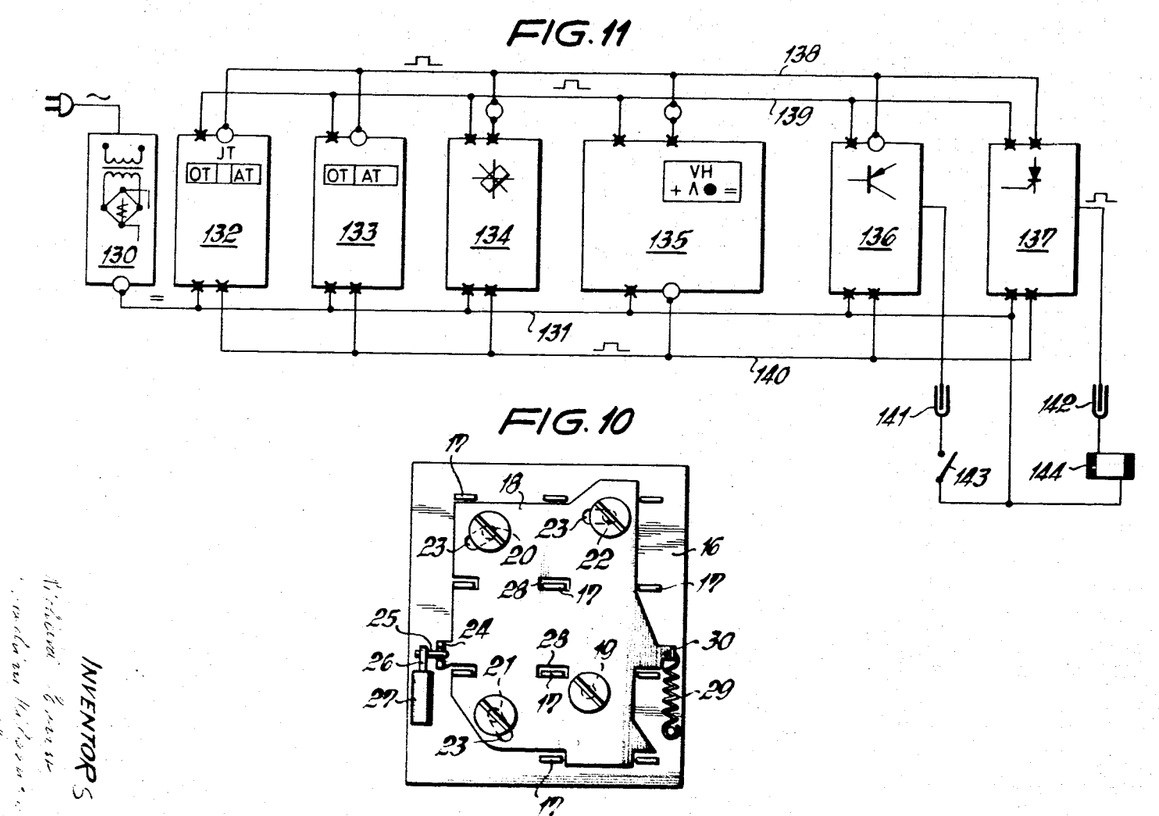
FIG. 10 is a schematic plan view illustrating locking means for the keyboard.
FIG. 11 is a schematic diagram illustrating the circuit of the electronic computer and control means.

A locking device for keys 2 is shown in FIG. 10. The key stems 17 are guided in a plate 16. The key stems have recesses, not shown, cooperating with a locking plate 18 which is mounted on a pivot 19 for angular movement, and is guided by studs 20, 21 and 22 located in circular slots 23 of locking plate 18 so that the same can turn about pivot 19. Locking plate 18 has a transversely bent lug 24 engaged by a pin 25 secured to the armature of an electromagnet 27. When electromagnet 27 is energized, armature 26 is attracted, and locking plate 18 is turned in counterclockwise direction to the inoperative position shown in FIG. 10 in which key stems 17 freely pass through cutouts 28 of locking plate 18, permitting operation of keys 2.

When electromagnet 27 is deenergized, a spring 29 which is secured to a lug 30 of the locking plate 18, turns the same in clockwise direction about pivot 19 to a locking position in which the edges of the cutouts 28 of locking plates 18 are located in the recesses, not shown, of key stems 17 so that the keys are locked and cannot be operated.

Figure 6:
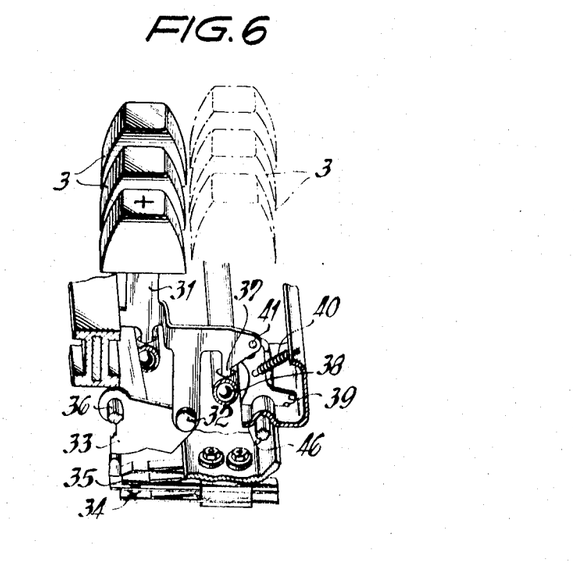
FIG. 6 is a fragmentary perspective view, partially in section, illustrating a group of function keys.

The arrangement of the function keys 3 is shown in FIGS. 6 to 9b. Keys 3 are secured to key stems 31 connected by a pin 32 with a lever 33 for a pair of contacts 34, 35, as shown in FIG. 6. A row of key levers 33 is mounted on a common shaft 36. Key stems 31 have projections 37 cooperating with a ball locking device 38 of conventional construction in which a row of balls in a closed channel permits entry of only one projection 37 so that only one key 3 can be operated at any time. Each key stem 31 has a pin 41 cooperating with a locking pawl 39 biased by a spring 40. Pawls 39 are arranged in a row on a common shaft 42, as best seen in FIGS. 8a to 8e. Each locking pawl 39 has a nose 43 bounding a recess 44 and also an oblique surface on a slanted projection 45, see FIGS. 9a and 9b. In the position of rest of keys 3, the arresting device is in the position of FIG. 8a. When a key 3 is depressed, pin 41 slides on the nose 43 of the respective locking pawl 39 and turns the same in clockwise direction as shown in FIG. 8b. When the key is released pin 41 moves under nose 43 as shown in FIG. 8c. In this position, key stem 31 and the respective key 3 are locked.

It may be desirable to release the keys in two different ways. Some of the keys can be released by a second depression to return to the position of rest. Other keys must remain locked for the time required for the performance of a particular function of the accounting machine, whereupon an impulse is given to energize an electromagnet which releases the locking means.

Figure 9A:
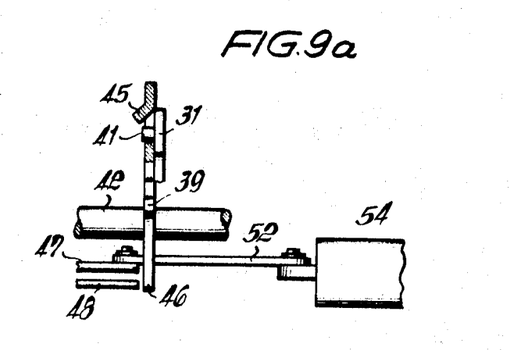
FIGS. 9a and 9b are fragmentary front views illustrating different positions of arresting and clearing means for the key.
Figure 9B:
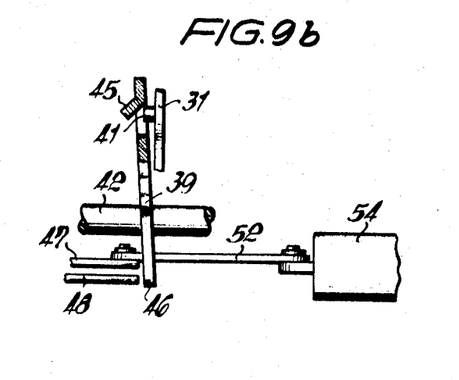

Keys 4, for example, by which different programs of operations of the machine are selected, can be released by a second depression, and no electromagnetic release is provided for these keys. However, if a sufficiently large number of function keys 3 is provided, the same are also locked in the depressed condition, but when the operation started by depression of the respective key 3 has been completed, an electromagnet is energized to release the respective key in a manner which will now be described with reference to FIGS. 7 and 9.

Figure 8A:
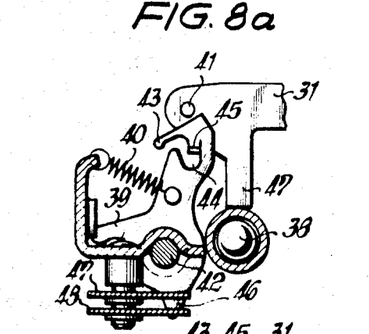
FIGS. 8a to 8e are fragmentary sectional views illustrating successive positions of means for arresting and clearing a key.
Figure 8B:
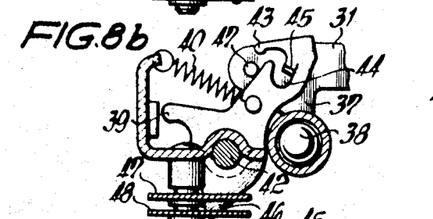
Figure 8C:
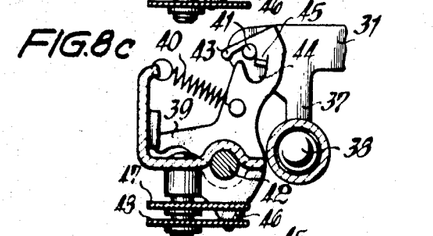
Figure 8D:
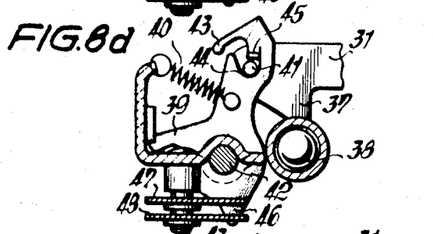
Figure 8E:
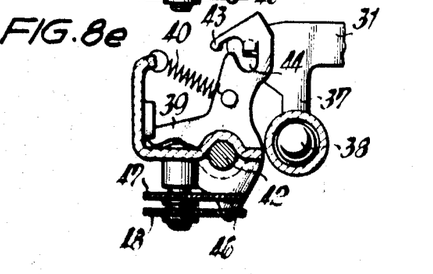

When a key which is in the depressed and locked position of FIG. 8c is again operated, pawl 39 is moved to the position of FIG. 8d since pin 41 moves into recess 44. At the same time, spring 40 turns pawl 39 in counterclockwise direction so that pin 41 is located under the slanted projection 45. When the key is released by the operator, pin 41 and key stem 31 are guided by the slanted projection 45 to move under the action of the key spring, not shown, to the position of rest. Pawl 39 is tilted during this movement, as shown in FIG. 9b. In order to permit such tilting movement, pawls 39 are mounted with play on shaft 42.

If a manual clearing of the keys is not desired, pawl 39 can be made without the slanted projection 45 and the cutout below the same so that the second depression does not cause tilting of the pawl, and release of the key.

Figure 7:
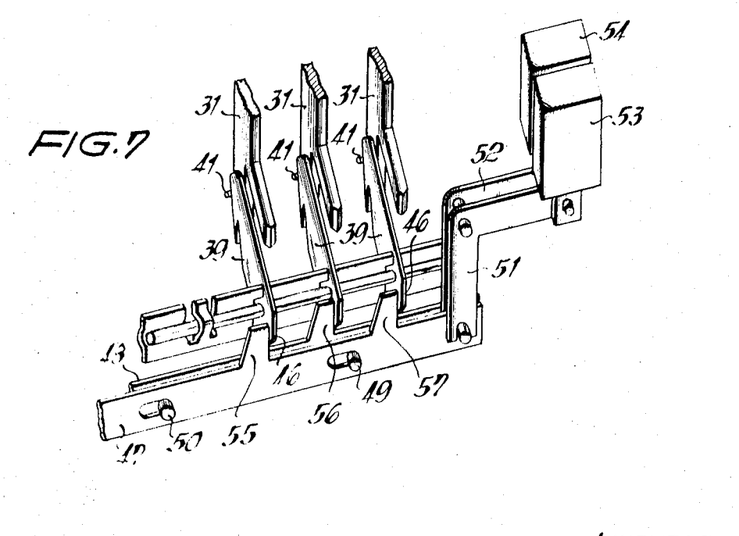
FIG. 7 is a fragmentary perspective view illustrating clearing means for input keys.

The electromagnetic release of a depressed and locked key can be provided in both cases, and is shown in FIG. 7. Each of the locking pawls 39 has a downwardly projecting lug 46 permitting a cooperation between locking pawls 39 and a pair of slides 47 and 48 mounted on guide pins 49 and 50 and connected by angular levers 51 and 52 with two electromagnets 53 and 54. Slide 48 has a nose 56, and slide 47 has two noses 55 and 57 cooperating with the lugs 46 of locking pawls 39, as shown in FIGS. 7 and 8a to 8e. By selectively operating electromagnet 53 or electromagnet 54, one or the other row of keys can be cleared. For example, the slide 47 may extend along the first column of keys formed by keys 13, 14 and 15, while slide 48 extends along the second column. A third slide, not shown, may be provided for the third column of keys.

On the other hand, it is also possible to construct the key stem 31 and the noses of slides 47 and 48 so that other combinations of keys can be cleared. While two switch contacts are shown in FIG. 6, any number of switches can be operated by each function key 3 including normally open and normally closed, or shifted contacts, as required by the function to be initiated by the operation of the respective function key.

Referring again to FIG. 1b, an ordinal series of setting means 60 is provided which are arranged in a row so that only one setting means 60 is visible in FIG. 1b. The setting means correspond to the differential actuators of conventional accounting and calculating machines which sense the position of actuated keys in machines having a full keyboard, or sense the position of the set pins of a pin carriage in a ten key machine. In the construction of the present invention, the ordinal setting means are not connected with the keys of the keyboard. A spring 61 is connected with each setting member and abuts a fixed frame portion 62 so that each setting member is urged toward the left as viewed in FIG. 1b. An abutment rail 63 engages projections of the setting members to hold the same in a normal aligned inoperative position against the action of spring 61.

A motor 64 drives through a coupling 65 a worm gear transmission operating a cam 67, only partly shown in FIG. 1b, which operates cam follower means, not shown, during a machine cycle to move the abutment rail 63 in a reciprocating motion to the left and then again to the right as viewed in FIG. 1b so that the setting means 60 are released for movement under the action of springs 61.

Each setting means 60 has a rack portion 70 meshing with a gear 71 connected by another gear 72 to a gear 73. Gear 71 is secured to a lever 74 on which a printing lever 75 is pivotally mounted. Gear 72 is secured to printing lever 75 for turning movement, and gear 73 is turnably mounted on printing lever 75 and secured to a printing wheel 76.

A type wheel 76 and gear 73 is shown in FIG. 4 on a larger scale. Each gear 73 has eleven teeth of which ten teeth are respectively correlated with types representing the digits zero to nine, so that type wheel 76 has an empty peripheral portion in the region of the eleventh tooth of gear 73.

When the setting means, released by abutment rail 63 move forward under the action of the respective springs 61, a pin on each setting means 60 releases arresting pawls 77 and 78 so that printing levers 74, 75 can be turned by spring 74 in counterclockwise direction to make an imprint on a paper sheet supported by the platen 79 of a paper carriage 80. Pawls 77 and 78 are also controlled by cam followers, not shown, from cam 67. It is necessary to stop the moving setting means 60 in different positions corresponding to the representation of desired digital values by the several printing wheels 76 shown in FIG. 3. This is accomplished by an electromagnetic setting device 150. Each setting means 60 has an arresting bar 151 with teeth 152 mounted thereon on pins 154. Each arresting bar 151 has teeth 152 cooperating with an arresting pawl 156. An arresting electromagnet 153 is provided for each setting means 60, 151 and has a tilting armature 157 which, when the respective electromagnet 153 is energized, turns an angular pivotally mounted trigger 155 in clockwise direction so that the respective arresting pawl 156 is released and urged by a spring, not shown, into engagement with a notch between two teeth 152 of the respective arresting bar 151. Therefore, each setting means 60 is stopped during its forward movement under the action of spring 61 when the respective pawl falls into a notch of the respective arresting bar 151. Depending on the moment at which the moving setting means 60 is arrested, the angular position of the respective printing wheel 76 will be different, and a different digit will be printed.

A control element, not shown, is located behind the row of setting means 60, and cooperates with a photocell and a source of light, not shown. The control element forms a light barrier and has eleven cutouts corresponding to the eleven possible positions of each type wheel 76 so that during the forward stroke of the control element together with setting means 60 upon movement of abutment rail 63 to the left, up to eleven light impulses are produced which are supplied to the electronic computer where in each order of the number to be printed, a comparison is carried out whether the digit to be printed in any order corresponds to the digital position of the respective setting means 60. When this is the case, indicating that any one setting means 60 has reached a position in which its corresponding printing wheel 76 is in a printing position for the type representing the digit stored in the respective order in the computer, an impulse is given to the respective electromagnet 153, the respective trigger 155 releases arresting pawl 156, and the setting means, 60 is stopped in a position in which the type face of the respective printing wheel representing the correct digit is located opposite the platen 79. As setting means 60 arrive successively in the correct positions in accordance with the digit required to be printed in the respective order, they are successively stopped.

When all setting means are arrested, and the abutment rail 63 has reached its outermost position, cam 67 effects the release of the printing levers 74 and 75, and the simultaneous printing of all orders of the number represented by the ordinal series of printing wheels 76.

As mentioned above, the value data keyboard 2 has a key 11 which represents no digital value. The empty spot on the periphery of each type wheel 76 corresponds to this special key, and it is possible to stop the setting means 60 in each order in a position in which the respective type wheel 76 has its empty peripheral portion located opposite the platen so that no digit is printed upon operation of the printing levers.

The digital value stored in the computer either as an input value produced by the keyboard 2, or as a result of a calculation, is printed by the printing means due to the above explained comparison of the positions of the setting means 60, 151 with the number stored in the computer.

Figure 12:
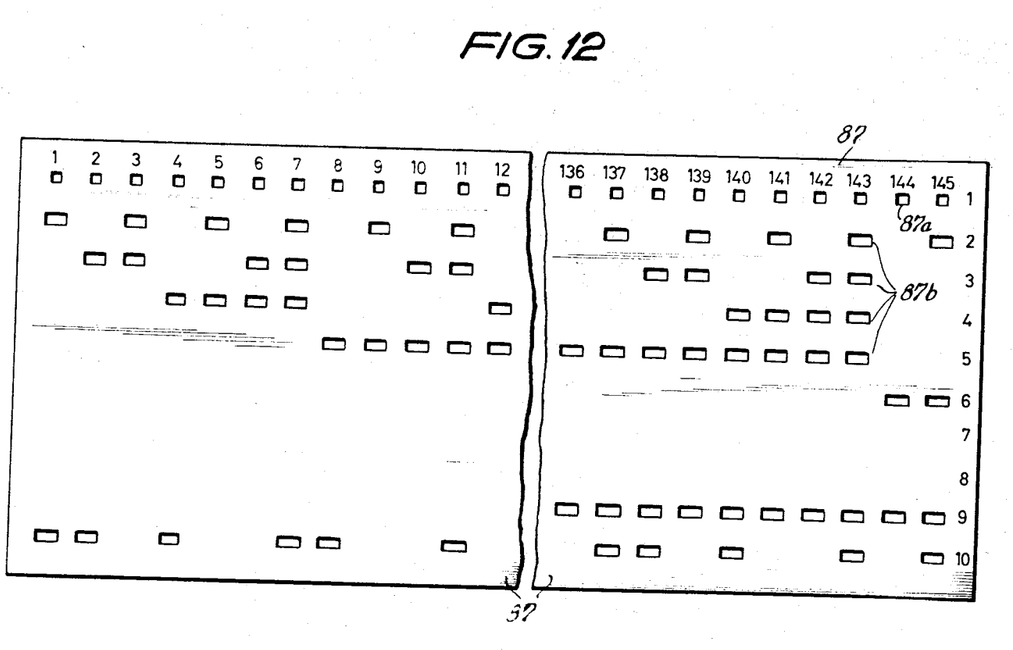
FIG. 12 is a plan view illustrating a control panel for the carriage of the machine.

The carriage 80 has rollers 81 in the rear secured to a bracket 82 and running in a straight guide groove of a rear rail 90, as shown in FIG. 1a. Carriage 80 has a rail 83 in front forming with a stationary rail 84 a guideway in which balls 85 are located. A pair of brackets 82 and 86 carries a control panel 87 which is preferably an opaque plate consisting of a synthetic plastic material and having light permeable spots 87a and 87b, as best seen in FIG. 12. The light permeable spots are arranged in ten tracks 1 to 10. Track 1 has, for example, 145 uniformly spaced transparent spots 87a corresponding to carriage steps 1 is a synchronizing or timing track. Tracks 2 to 9 have light permeable spots 37b arranged in accordance with the binary code, track 2 representing the position $2^0$ and tracks 3 to 9 representing the positions $2^1$ to $2^7$. Track 10 is a parity track. In any case in which the number of coded marks in tracks 2 to 9 is an odd number, a bit is added in track 10 to permit a parity check.

A photoelectric sensing station for light signals passing through the transparent marks of control panel 87, is mounted in the supporting structure 90, 89 on which the carriage 80 is supported. A frame 91 is mounted above control panel 87 and has ten recesses in which ten light bulbs 92 are disposed. Another frame 93 is mounted below control panel 87, and has ten recesses in which photocells 95 are disposed. The photocells 95 and the sources of light 92 form a row transverse to the tracks of control panel 87, and are stationary so that transverse lines of the control panel are successively sensed during movement of carriage 80 with control panel 87. The impulses produced in photocells 95 are used for controlling the movements of the carriage.

Carriage 80 has a fixed rack bar 96 meshing with a gear 97 mounted for rotation in the frame structure of the apparatus. Gear 97 is connected by gears 98 and 99 with a gear 100 fixed to a shaft 101 mounted on frame walls 102 and 103. A gear 105 and an arresting wheel 106 are mounted on shaft 101 by means of a connecting bushing 104. A pawl 107 cooperates with arresting wheel 106 so that the same is normally locked against rotation in both directions, but pawl 107 is turnable about a pivot 108 and can be shifted by a stop electromagnet 109 to a position releasing arresting wheel 106 and permitting turning movement of gear 105.

A conventional carriage spring, not shown, is connected with carriage 80 and urges the same forwardly in the normal writing direction. The carriage is tabulated in the forward writing direction when upon a comparison of a previous carriage position address with a new carriage position address determined by the control means of the electronic computer, it is found that the required new position address of the carriage is located forwardly of the previous carriage position address, having a higher value in ordinary binary code as per the marking 87b of the control panel 87. In this case, the carriage is forwardly tabulated until photocells 95 sense a row of transparent marks representing the new position address of the carriage. In this event, a signal from the computer deenergizes electromagnet 109, so that pawl 107 engages arresting wheel 106 and stops shaft 101, and through gear train 100, 99, 98, 97 and rack bar 96, also carriage 80.

During movement of the carriage in the released position of pawl 107, the rotary movement of shaft 101 and gear 105 is transmitted to a gear 110 which is fixed to a shaft 111 connected by a magnetic clutch 112 to the shaft 116 driven by motor 64. The magnetic clutch 112 has a pot-shaped member 113 secured to shaft 111 and carrying a winding 114. The magnetic field produced by winding 114 closes through a coupling disc 115 secured to shaft 111. Another coupling disc 117 is connected with shaft 116 for rotation by a pin on shaft 116 projecting into a recess in the hub of disc 117. When winding 114 is energized, the magnetic field between pot-shaped member 113 and coupling disc 115 is closed so that coupling disc 117 is attracted and coupled to coupling disc 115 so that shafts 116 and 111 are coupled, and motor 64 drives through coupling 65 and gear 66, shafts 116, 111, and gear 110 which meshes with gear 105 so that shaft 101 is rotated to move carriage 80 through gear train 97 to 100 in the rearward return direction, assuming that pawl 107 releases the arresting wheel 106.

Consequently, the carriage can be tabulated in forward writing direction by the carriage spring, not shown, and in rearward return direction by motor 64 so that the carriage spring is tensioned.

During the movement of the carriage, the photoelectric sensing means 95, 92 sense the position of control panel 87 and produce impulses corresponding to the coded information contained in transverse rows of marks 87a, 87b on control panel 87. Marks 87b form different combinations representing different positions of the carriage. A corresponding combination of photocells produces impulses which are supplied to control means of the electronic computer which compare each combination of signals produced by successive transverse rows of transparent marks with the combination representing the desired position stored in the computer. If the new position has a smaller number than the position in which the carriage is located, the carriage must be tabulated in rearward direction which is effected by energizing magnetic clutch 112 and electromagnet 109 which operates pawl 107 to release the carriage for tabulating movements. Motor 64 then drives carriage 80 in rearward direction through gears 110, 105, shaft 101 and gear train 97 to 100. While the carriage moves rearward, successive transverse rows of light permeable marks are sensed by the sensing means 95, 92, and when the sensed information is identical with the information stored in the computer and representing the desired position of the carriage, the carriage is stopped.

This is gradually effected, and first magnetic clutch 112 is deenergized so that the carriage moves on by inertia beyond the desired new position whereupon the carriage movement is reversed and the carriage spring, not shown, moves the carriage forwardly while the sensing means sense the few transverse rows of coded marks which have passed the desired position. When during such forward movement, the row of coded marks which is sensed produces the same information as stored in the computer, as before during the rearward movement, electromagnet 109 is deenergized so that pawl 107 locks arresting wheel 106 and stops the carriage.

In order to assure that the carriage is stopped in the correct desired position, five carriage steps before the new desired position, a second magnetic coupling 120 is energized. Magnetic coupling 120 connects shaft 111 through gears 123, 122 with a centrifugal brake 121. Gear 123 is freely rotatable on shaft 111 and is fixed to the same by engagement of coupling disc 124 by the energized magnetic coupling 120, which may be constructed as described and illustrated in detail for the magnetic coupling 112. The rotating weights 125 abut the inner surface of the pot-shaped fixed part 126 of the centrifugal brake 121 and produce the desired braking effect before the carriage has arrived in the desired end position in accordance with the information stored in the computer. When the coded marks in control panel 87 sensed by the sensing means 95, 92 are identical with the combination stored in the computer, magnet 109 is deenergized and pawl 107 stops the carriage.

During forward tabulating movement of the carriage, a centrifugal brake 127 whose weights are mounted on a portion of shaft 111, is operated to limit the speed during forward tabulating movement. Since electromagnetic coupling 120, 124 is not energized, no motion is transmitted by gear 123 to the brake 121.

The electronic computer and control system is schematically illustrated in FIG. 11, and the details of this construction are not a part of the present invention. A first unit 130 is connected to a source of alternating current and contains a transformer and a rectifier bridge for producing a direct current voltage which is supplied through a line 131 to the other units of the system. Transmitting outputs are indicated by circles, and receiving inputs are indicated by crosses in FIG. 11. Unit 132 represents the macroprogram, and unit 133 the microprogram. The microprogram is exchangeable, and several programs may be stored and selected by operation of one of the four program selecting keys 4 described with reference to FIG. 2. The individual program steps of the macroprogram determine corresponding operations of the computer. The microprogram, on the other hand, serves for the internal control of the computer and contains sequences of operations represented by corresponding programs which are carried out upon a control signal from the macroprogram which may contain several such subprograms.

A storage unit 134 is constructed as a matrix storage device which is adapted to store, for example, 128 words of 16 characters, each represented by four bits. A part of the storage unit can be selectively programmed, and may be activated by operation of keys 5. Other parts of the storage are permanent storage units used for short time storage, for the storage of characteristic data, of magnetic conditions, and for carriage positions.

For example, a part of the storage contains a great number of constant factors, for example the digits from 0 to 9, and the "no value" position which is entered from microprogram 133 into the storage 134 over the computer and control unit 135. Unit 135 is the totalizer and control unit, and the heart of the computer. All computing operations, control operations and timing operations are carried out by this unit. Comparison of numbers, addition, cyclical totalizing, multiplication and other operations are carried out by unit 135.

Unit 136, however, is an input matrix, and unit 137 an output matrix. The several units are connected to each other by the information main line 138, and by the timing line 139 which assures a synchronous operation of all units of the computer and control system. A line 140 is provided for transmitting information representing a carriage position to and from the individual units.

Each detachable connection 141 and 142 schematically indicates a number of corresponding connections, and constitute a juncture between the electronic computing and control apparatus shown in FIG. 11, and the mechanical parts of the machine whose input is represented by the switch 143 which corresponds to all input switches controlled by keys, namely the switches of value keys 2, function keys 3, program selector keys 4, selector keys 6 for auxiliary units, and of keys 5 which serve for selecting storage devices of unit 134. However, the control signals produced by control panel 87 in the form of impulses of the photocells 95, are also input signals.

Furthermore, the devices which control the position of the paper form on the platen of carriage 80, produce signals which are fed back when contacts are closed, and switch 143 also represents such contacts. The signals produced by key switches, photocells and other parts of the apparatus, as explained above, are introduced into the input amplifier matrix 136 which contains an amplifier for each circuit path and signal, the amplifiers being arranged in lines and columns and being read out in accordance with the program over read out lines connected with the columns and lines and also with the central computer unit 135. For example, the amplifiers for the switches of value keys 2 are all arranged in a single line of the matrix and are successively read out column by column. At the same time with the timed reading out of the columns of the amplifiers, the coded representations of the value data "no value," and zero to nine are successively read out as constants from corresponding storage devices of storage unit 134 and entered in the central computer unit 135. If a column is read out and a contact closure is determined, this coded representation is transmitted to the corresponding storage device of the storage unit 134 provided for this position. For each input of a multiorder number, the input amplifier matrix is read out as many times as the respective number has orders, and for each reading out operation, all coded representations stored as constant factors in storage unit 134, are transmitted into the central computer unit 135 and stored in another storage device when a contact closure has been found, or is cleared when a contact closure has not been found.

The carriage position comparison during the carriage movement is carried out in a similar manner. In this case, the new address representing the carriage position to be reached, for example carriage position 137 is taken into the central computer unit 135 together with the other information. The input amplifier matrix supplies under the control of control panel 87 successively carriage positions into the central computer unit 135, and when the position of the carriage corresponds to the position stored in the computer, the carriage is stopped as explained above.

At the output 142, a relay or electromagnet 144 schematically represents electromagnets 153 which determine the position of the printing means, or the stop magnet 109 which stops the carriage, or the windings of electromagnetic couplings 112 and 120. However, electromagnet 114 also represents an electromagnet, not shown, which causes turning line shifting movement of platen 79, or one of the electromagnets 53 and 54 which cause clearing of the function keys 3 after the operation initiated by the same has been carried out. For each of the above-mentioned electromagnets which are represented by electromagnet 144 in FIG. 11, an amplifier is provided in the output amplifier matrix 137. As in the input amplifier matrix 136, the amplifier elements are arranged in lines and columns and are read out by impulses supplied to the lines and columns in accordance with the program. For example, there is an amplifier element provided for each electromagnet 153 which energizes the respective magnets at the proper moment during the turning movement of the printing wheels in accordance with the number which is to be printed and stops the setting means 60 in positions representing the digits which are to be printed in the several orders.

It will be understood that each of the elements described above, or two or more together, may also find a useful application in other types of data processing accounting machines differing from the types described above.

While the invention has been illustrated and described as embodied in an accounting machine in which a printer controlled by an electronic computer prints all orders of a number simultaneously in a column of a form carried by a tabulated carriage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the claims.

1. Data processing and printing accounting machine, comprising, in combination, input means including digit keys, fuction keys, and key switch means; a program controlled electronic computer having control means connected with said key switch means for receiving information introduced by selective actuation of said digit keys and function keys; output means including a printer having an ordinal series of printing means, each printing means being independently movable between printing positions representing different value data introduced by said digit keys, and value data calculated by said computer, said printing means being simultaneously operable for printing a multiorder number; an ordinal series of driven differential setting means cooperating with said printing means, respectively, to move the same between said printing positions; electrically operable arresting means controlled by said control means of said computer to arrest said setting means when the same have placed said printing means in printing positions for printing a number; carriage means movable relative to said printer in forward and rearward directions and having a platen for supporting a paper form having columns, said platen cooperating with said printing means; and tabulating means controlled by said control means of said computer for tabulating said carriage means so that said printer prints on said paper form in columns determined by said computer, numbers determined by said computer.

2. An accounting machine as claimed in claim 1 wherein said computer includes exchangeable program means electrically connected with said tabulating means for stopping said carriage means in columns in accordance with a program.

3. An accounting machine as claimed in claim 1 wherein said computer is adapted to add, subtract, multiply and divide, and comprising electric motor means for driving said setting means; wherein said arresting means include electromagnetic means energized under the control of said control means in timed relation to the movement of said setting means; and wherein said carriage means is movable between positions in which different columns are located opposite said printer.

4. An accounting machine as claimed in claim 1 comprising means for locking said digit keys and said function keys in different combinations; and including releasing magnets controlled by said control means of said computer in accordance with the program to operate said locking means to release said keys.

5. An accounting machine as claimed in claim 1 wherein said function keys include keys having key switch means for causing said computer to perform different calculating operations, program selector keys and key switch means connected with said computer for selecting different programs, storage selector keys and key switch means connected with said computer for storing values, said computer having a plurality of storing devices, and control keys and key switch means adapted to actuate selected auxiliary devices, respectively.

6. An accounting machine as claimed in claim 1 wherein said control means of said computer comprise an input matrix having amplifier elements arranged in lines and columns; and wherein said key switch means are connected with said input matrix for storing information in the same, said control means including means for reading out information stored in said input matrix.

7. An accounting machine as claimed in claim 1 wherein said carriage means movable and includes a control panel having a predetermined number of rows of coded marks extending transverse to the direction of carriage movement and representing different carriage positions; and wherein said tabulating means include sensing means for successively sensing said rows of coded marks during movement of said carriage means and generating corresponding position signals; wherein said computer comprises comparison means for comparing said position signals with a carriage position stored in the computer; wherein said control means respond to equality of said position signals with the stored position to actuate said tabulating means to stop said carriage means in the position programmed and stored in said computer.

8. An accounting machine as claimed in claim 1 wherein said first tabulating means includes a carriage spring urging said carriage means to move in forward direction, wherein said second tabulating means includes a drive motor, an electric coupling, and transmission means connecting said electric coupling with said carriage means so that said motor drives said carriage in rearward direction when said electric coupling means is energized, said electric coupling means being connected with said control means of said computer and being operated by the same in accordance with the program; and comprising arresting means for arresting said carriage means in any carriage position, and a releasing electromagnet for releasing said arresting means, and being controlled by said control means of said computer in accordance with a program to release said arresting means to permit carriage movement in forward direction under the action of said carriage spring.

9. An accounting machine as claimed in claim 8 wherein said carriage means comprise a control panel having a predetermined number of rows of light permeable marks arranged in different combinations to represent different carriage positions; comprising photoelectric sensing means for sensing successive rows of marks during carriage movement, and producing position representing signals supplied to said computer; wherein said computer includes a comparison device for comparing programmed and stored carriage positions with the position representing signals produced by said photoelectric sensing means; and wherein said control means energize said coupling and said releasing electromagnet if the programmed carriage position is located rearwardly of the sensed carriage position so that said motor moves said carriage means in rearward direction, and wherein said control means energizes said releasing electromagnet when said programmed carriage position is located forwardly of the sensed carriage position so that said carriage spring moves said carriage means and control panel in forward direction.

10. An accounting machine as claimed in claim 9 and including centrifugal brake means connected with said transmission means for braking movement of said carriage means and an electromagnetic coupling means connecting said brake means with said motor, and being normally disengaged, said coupling means being energized under the control of said control means when said photoelectric sensing means sense a carriage position and row of coded marks on said control panel spaced several rows of coded marks from the row representing the programmed carriage position.

11. Data processing and accounting machine, comprising, in combination, an electronic computer including program means; input means including keys and key switch means electrically connected with said computer; a printing unit including printing means for printing digits; and differential setting means controlled by said computer for setting said printer to different printing positions for printing different numbers determined by said computer; a carriage unit including a platen for supporting a paper form having columns; and tabulating means controlled by said program means of said computer to move one of said units relative to the other unit between positions in which said printing means are located opposite columns of said paper form predetermined by the program of said program means for printing in the same numbers determined by said computer.

12. A machine as claimed in claim 11 comprising sensing means for sensing the position of said one moving unit and producing signals representing the position of the same during movement of the same; and comparison means in said computer for comparing said position representing signals with a programmed position of said one unit stored in said program means; and wherein said tabulating means are controlled by said comparison means to stop said one unit in the programmed carriage position whereby said printer is located in a selected column.

13. A machine as claimed in claim 12 wherein said tabulating means include means for moving said one unit forward if the sensed carriage position is rearwardly of the programmed carriage position, and for moving said carriage means rearward if the sensed carriage position is located forward of the programmed carriage position.

14. A machine as claimed in claim 13 and comprising a keyboard including digit keys and function keys.

15. A machine as claimed in claim 13 wherein said keys and key switches include digit keys and digit key switches, function keys and function key switches for causing said computer to perform different calculating operations, program selector keys and key switches for selecting different programs, storage selector keys and key switches for storing values in said computer; and wherein said computer has a plurality of storing devices for storing information introduced by said keys and key switches.

References Cited

UNITED STATES PATENTS

| | | |
|---|---|---|
| 2,896,845 | 7/1959 | Hansen et al. |
| 3,106,340 | 10/1963 | Meister. |
| 3,242,317 | 3/1966 | Reiss et al. _________ 235—61.9 |

THOMAS A. ROBINSON, Primary Examiner